(12) United States Patent
Ki et al.

(10) Patent No.: US 11,605,003 B2
(45) Date of Patent: Mar. 14, 2023

(54) METHOD AND DEVICE FOR GENERATING TRAINING DATA AND COMPUTER PROGRAM STORED IN COMPUTER-READABLE RECORDING MEDIUM

(71) Applicant: SUALAB CO., LTD., Seoul (KR)

(72) Inventors: Hongdo Ki, Seoul (KR); Hyunjun Kim, Seoul (KR)

(73) Assignee: SUALAB CO., LTD., Seoul (KR)

( * ) Notice: Subject to any disclaimer, the term of this patent is extended or adjusted under 35 U.S.C. 154(b) by 428 days.

(21) Appl. No.: 16/641,195

(22) PCT Filed: Jul. 30, 2018

(86) PCT No.: PCT/KR2018/008619
§ 371 (c)(1),
(2) Date: Feb. 21, 2020

(87) PCT Pub. No.: WO2019/039757
PCT Pub. Date: Feb. 28, 2019

(65) Prior Publication Data
US 2020/0380373 A1   Dec. 3, 2020

(30) Foreign Application Priority Data

Aug. 24, 2017  (KR) ........................ 10-2017-0107502

(51) Int. Cl.
*G06N 3/00* (2006.01)
*G06N 3/088* (2023.01)
*G06N 3/04* (2023.01)

(52) U.S. Cl.
CPC ........... *G06N 3/088* (2013.01); *G06N 3/0454* (2013.01)

(58) Field of Classification Search
CPC .... G06N 3/088; G06N 3/0454; G06N 3/0472; G06N 3/084; G06K 9/6256;
(Continued)

(56) References Cited

U.S. PATENT DOCUMENTS 8,873,856 B1    10/2014  Chapleau et al.
2003/0086081 A1*  5/2003  Lehman .............. G03F 7/70433
                                                        430/311
(Continued)

FOREIGN PATENT DOCUMENTS

JP         11014553 A      1/1999
JP       2001202265 A      7/2001
(Continued)

OTHER PUBLICATIONS

International Search Report dated Nov. 7, 2018 for PCT Application No. PCT/KR2018/008619, 2 pages.

*Primary Examiner* — Nancy Bitar
*Assistant Examiner* — Xiao Liu
(74) *Attorney, Agent, or Firm* — Seed IP Law Group LLP

(57) ABSTRACT

A method includes inputting defect data of a source domain, to which a first mask is applied/unapplied to a reconstruction algorithm. The algorithm is trained to generate defect data of the source domain, to which the first mask is reconstructed. Normal data of the source domain is input to the algorithm, and includes data to which a second mask is applied, and data to which the second mask is not applied. The algorithm is trained to generate normal data of the source domain, to which the second mask is reconstructed. Normal data of a target domain is input to the algorithm, and the normal data of the target domain includes data to which the second mask is applied, and data to which the second mask is not applied. The algorithm is trained to generate normal data of the target domain, to which the second mask is reconstructed.

12 Claims, 8 Drawing Sheets

(58) Field of Classification Search
CPC .............. G06K 9/6271; G06T 7/0004; G06T 2207/20081; G06T 2207/20084; G06T 5/001; G06V 10/82
See application file for complete search history.

(56) References Cited

U.S. PATENT DOCUMENTS

2017/0177997 A1* 6/2017 Karlinsky ............ G06V 10/993
2019/0012579 A1* 1/2019 Namiki ................ G06V 10/454

FOREIGN PATENT DOCUMENTS

| JP | 2005156334 A | * | 6/2005 |
| JP | 2005156334 A | | 6/2005 |
| JP | 2008139074 A | | 6/2008 |
| KR | 101688458 B1 | | 12/2016 |

* cited by examiner

METHOD AND DEVICE FOR GENERATING TRAINING DATA AND COMPUTER PROGRAM STORED IN COMPUTER-READABLE RECORDING MEDIUM

TECHNICAL FIELD

The present disclosure relates to image processing, and more particularly, to a method of generating training data.

BACKGROUND ART

Pattern recognition is one field of machine learning, and means learning to recognize regularity of a pattern and data. A pattern recognition technology includes a supervised learning method and an unsupervised learning method. The supervised learning method means a method in which an algorithm learns a pattern recognition by using data (referred to as "training data") in which a result of the pattern recognition is already determined.

Various methods are presented for implementing a pattern recognition technology, and U.S. Pat. No. 8,873,856 illustrates an example of the pattern recognition technology.

However, regardless of the kind and the method of the pattern recognition algorithm, as the training data is more diverse and the number of data is larger, higher quality learning is performed, so that there is a need for a technology to broadly secure a large amount of training data. Particularly, in the case where the data is a defect in a different pattern generated in a producing process, although a defect that can occur under the same producing process tends to have a similar appearance even on the different pattern, the defect data inconveniently needs to be obtained through a separate operation for each different pattern.

Accordingly, there is a need in the art for efficiently obtaining defect data in various patterns as training data.

SUMMARY OF THE INVENTION

The present disclosure is conceived in response to the background art, and has been made in an effort to provide a method of generating training data.

An exemplary embodiment of the present disclosure for implementing the foregoing object discloses a method of generating defect data of a target domain by using defect data of a source domain. The method of generating defect data of a target domain by using defect data of a source domain includes: inputting defect data of a source domain, to which a first mask is applied, and defect data of the source domain, to which the first mask is not applied, to a reconstruction algorithm; first training the reconstruction algorithm so as to generate defect data of the source domain; to which the first mask is reconstructed; inputting normal data of the source domain, to which a second mask is applied, and normal data of the source domain, to which the second mask is not applied, to the reconstruction algorithm; second training the reconstruction algorithm so as to generate normal data of the source domain, to which the second mask is reconstructed; inputting normal data of a target domain, to which the second mask is applied, and normal data of the target domain, to which the second mask is not applied, to the reconstruction algorithm; and third training the reconstruction algorithm so as to generate normal data of the target domain, to which the second mask is reconstructed.

Alternatively, the method may include: inputting the normal data of the target domain, to which the first mask is applied, to the reconstruction algorithm which is finally trained so as to generate the data, to which the mask is reconstructed, from the data to which the mask is applied; and generating the defect data of the target domain by using the finally trained reconstruction algorithm.

Alternatively, the defect data and the normal data may be image data.

Alternatively, the first mask may mask a defect part of the defect data, and the first mask and the second mask may be distinguished with different colors.

Alternatively, the first mask may have a shape for hiding a defect part of the defect data, and the second mask may have a shape which is the same as or different from that of the first mask.

Alternatively, the source domain and the target domain may have different patterns.

Alternatively, the reconstruction algorithm may include a generating network and an identification network, and the first training may include: inputting the defect data of the source domain, to which the first mask is applied, to the generating network; generating defect data of the source domain, to which the first mask is reconstructed, from the defect data of the source domain, to which the first mask is applied, by using the generating network; inputting the defect data of the source domain, to which the first mask is not applied, and the defect data of the source domain, to which the first mask is reconstructed, to the identification network; outputting distinguishment information by comparing the defect data of the source domain, to which the first mask is not applied, and the defect data of the source domain, to which the first mask is reconstructed, by using the identification network; training the generating network and the identification network based on the distinguishment information; and regenerating defect data of the source domain, to which the first mask is reconstructed, from the defect data of the source domain, to which the first mask is applied, by using the trained generating network.

Alternatively, the outputting of the distinguishment information by comparing the data, to which the mask is not applied, and the data, to which the mask is reconstructed, in the identification network may include dividing the data, to which the mask is reconstructed, and the data, to which the mask is not applied, into image patches having a predetermined size and comparing the data for each image patch.

Alternatively, the image patch may have a size of 1 pixel.

Alternatively, the training of the generating network and the identification network based on the distinguishment information may include calculating a value for a loss function of the reconstruction algorithm from the distinguishment information. Alternatively, the generating network may consist of a total of n layers, the first layer to the $n^{th}$ layer may be sequentially connected, and separately, the $i^{th}$ layer and the $(n-i+1)^{th}$ layer may be connected ($i>0$, $i<n/2$).

Another exemplary embodiment of the present disclosure discloses a computer program stored in a computer readable storage medium, the computer program including a plurality of commands executed by one or more processors of a computing device. The computer program includes: a command for inputting defect data of a source domain, to which a first mask is applied, and defect data of the source domain, to which the first mask is not applied, to a reconstruction algorithm; a command for first training the reconstruction algorithm so as to generate defect data of the source domain, to which the first mask is reconstructed; a command for inputting normal data of the source domain, to which a second mask is applied, and normal data of the source domain, to which the second mask is not applied, to the reconstruction algorithm; a command for second training the reconstruction algorithm so as to generate normal data of the source domain, to which the second mask is reconstructed; a command for inputting normal data of a target domain, to which the second mask is applied, and normal data of the target domain, to which the second mask is not applied, to the reconstruction algorithm; and a command for third training the reconstruction algorithm so as to generate normal data of the target domain, to which the second mask is reconstructed.

Another exemplary embodiment of the present disclosure discloses a computing device for generating defect data of a target domain by using defect data of a source domain. The computing device may include: one or more processors; and a memory for storing commands executable in the one or more processors, and the one or more processors may input defect data of a source domain, to which a first mask is applied, and defect data of the source domain, to which the first mask is not applied, to a reconstruction algorithm; first train the reconstruction algorithm so as to generate defect data of the source domain, to which the first mask is reconstructed, input normal data of the source domain, to which a second mask is applied, and normal data of the source domain, to which the second mask is not applied, to the reconstruction algorithm, second train the reconstruction algorithm so as to generate normal data of the source domain, to which the second mask is reconstructed, input normal data of a target domain, to which the second mask is applied, and normal data of the target domain, to which the second mask is not applied, to the reconstruction algorithm, and third train the reconstruction algorithm so as to generate normal data of the target domain, to which the second mask is reconstructed.

The present disclosure may provide a method of generating training data.

BRIEF DESCRIPTION OF THE DRAWINGS

Some of the exemplary embodiments are illustrated in the accompanying drawings in order that the above-mentioned characteristics of the contents of the present disclosure may be understood in detail with more detailed description with reference to the following exemplary embodiments. Further, the similar reference numerals in the drawing intend to designate the same or similar function throughout several aspects. However, the accompanying drawings simply illustrate specific typical exemplary embodiments of the contents of the present disclosure, and are not considered to limit the scope of the present disclosure, and it is noted that other exemplary embodiments having the same effect may be sufficiently recognized.

DETAILED DESCRIPTION

Hereinafter, various exemplary embodiments are described with reference to the drawings. In the present specification, various descriptions are presented for understanding the present disclosure. However, it is apparent that the exemplary embodiments may be carried out even without the particular description. In other examples, publicly known structures and devices are provided in the form of a block diagram for easily describing the exemplary embodiments.

Terms, "component", "module", "system", and the like used in the present specification indicate a computer-related entity, hardware, firmware, software, a combination of software and hardware, or execution of software. For example, a component may be a procedure executed in a processor, an object, an execution thread, a program, and/or a computer, but is not limited thereto. For example, both an application executed in a computing device and the computing device may be components. One or more components may reside within a processor and/or an execution thread, and one component may be localized within one computer or may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The descriptions of the presented exemplary embodiments are provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

Figure 1:
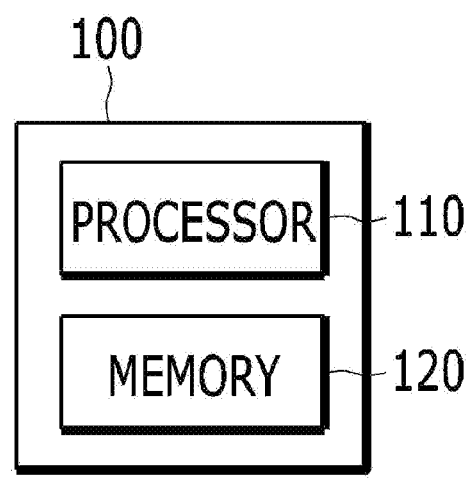
FIG. 1 is a block diagram illustrating a computing device according to an exemplary embodiment of the present disclosure.

FIG. 1 is a block diagram illustrating a computing device according to an exemplary embodiment of the present disclosure.

A computing device 100 according to an exemplary embodiment of the present disclosure may include a processor 110 and a memory 120. The block diagram of FIG. 1 illustrates a simplified configuration of the computing device, and the present disclosure is not limited thereto, and the computing device may include additional constituent elements required for driving.

The processor 110 may be one or more, and may include a central processing unit (CPU) of the computing device. The processor 110 may perform a method of generating defect data of a target domain by using defect data of a source domain according to an exemplary embodiment of the present disclosure by reading a computer program stored in the memory 120.

The computing device 100 according to the exemplary embodiment of the present disclosure may input defect data of a source domain, to which a first mask is applied, and defect data of the source domain, to which the first mask is not applied, to a reconstruction algorithm, first train the reconstruction algorithm so as to generate defect data of the source domain, to which the first mask is reconstructed, input normal data of the source domain, to which a second mask is applied, and normal data of the source domain, to which the second mask is not applied, to the reconstruction algorithm, second train the reconstruction algorithm so as to generate normal data of the source domain, to which the second mask is reconstructed, input normal data of a target domain, to which the second mask is applied, and normal data of the target domain, to which the second mask is not applied, to the reconstruction algorithm, and third train the reconstruction algorithm so as to generate normal data of the target domain, to which the second mask is reconstructed.

The computing device 100 according to the exemplary embodiment of the present disclosure may input the normal data of the target domain, to which the first mask is applied, to the reconstruction algorithm which is finally trained so as to generate the data, to which the mask is reconstructed, from the data to which the mask is applied, and generate the defect data of the target domain by using the finally trained reconstruction algorithm.

The memory 120 may store a computer program for performing the method of generating defect data of the target domain by using defect data of the source domain according to the exemplary embodiment of the present disclosure, and the stored computer program may be read and driven by the processor 110, a Graphic Processor Unit (GPU), and the like. The computer program may include a command for inputting defect data of a source domain, to which a first mask is applied, and defect data of the source domain, to which the first mask is not applied, to a reconstruction algorithm, a command for first training the reconstruction algorithm so as to generate defect data of the source domain, to which the first mask is reconstructed, a command for inputting normal data of the source domain, to which a second mask is applied, and normal data of the source domain, to which the second mask is not applied, to the reconstruction algorithm, a command for second training the reconstruction algorithm so as to generate normal data of the source domain, to which the second mask is reconstructed, a command for inputting normal data of a target domain, to which the second mask is applied, and normal data of the target domain, to which the second mask is not applied, to the reconstruction algorithm, and a command for third training the reconstruction algorithm so as to generate normal data of the target domain, to which the second mask is reconstructed.

In the following description with reference to the drawings, the method of generating defect data of the target domain by using defect data of the source domain according to the exemplary embodiment of the present disclosure will be disclosed in detail.

Figure 2A:
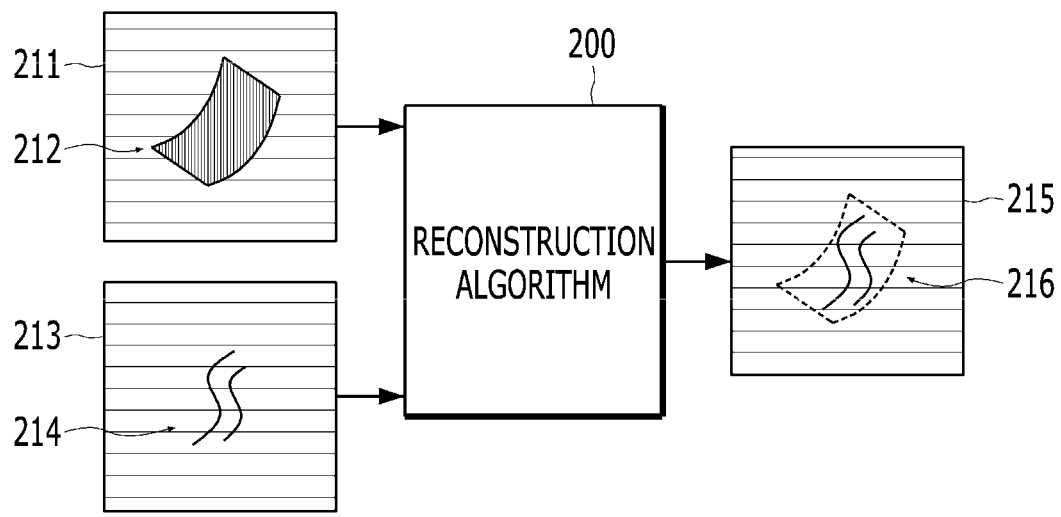
FIGS. 2A to 2C are diagrams illustrating input and output when a reconstruction algorithm generating defect data of a target domain is trained by using defect data of a source domain according to the exemplary embodiment of the present disclosure.
Figure 2B:
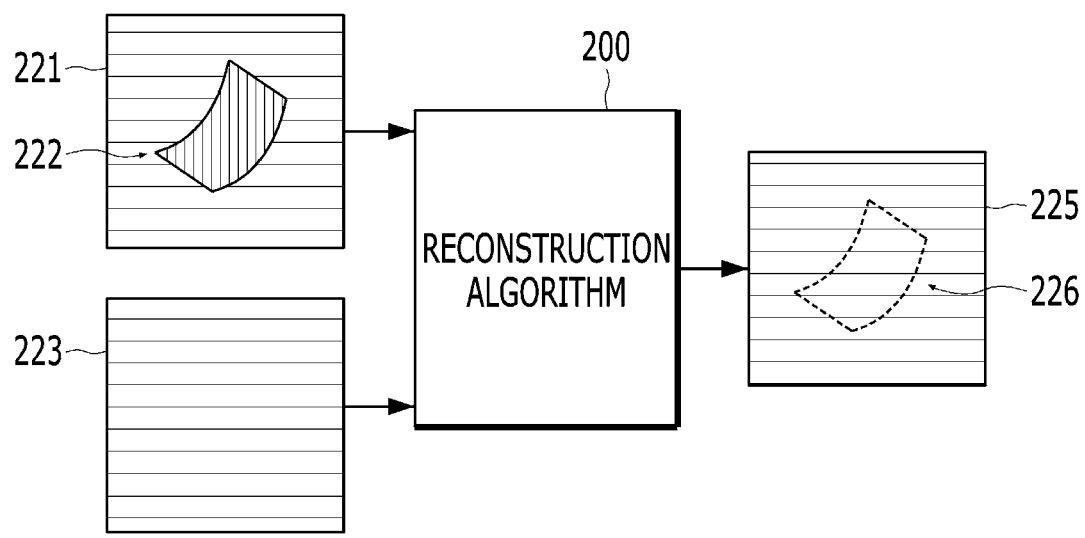
Figure 2C:
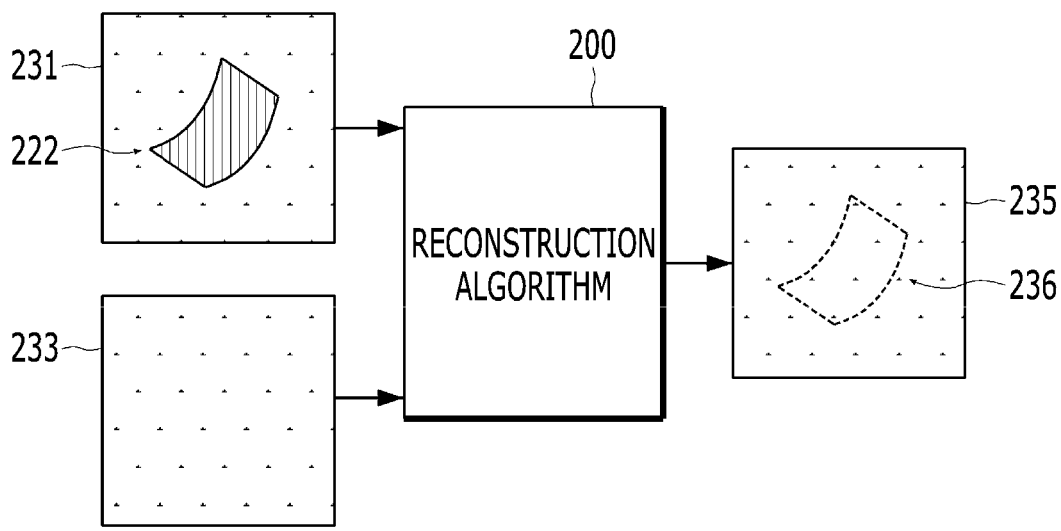

FIGS. 2A to 2C are diagrams illustrating input and output when the reconstruction algorithm generating defect data of the target domain is trained by using defect data of the source domain according to the exemplary embodiment of the present disclosure.

The reconstruction algorithm 200 according to the exemplary embodiment of the present disclosure may be an image reconstruction algorithm. Herein, the image reconstruction algorithm may include, for example, a Variational Autoencoder (VAE) and a Generative Model, and particularly, include generative adversarial networks, conditional generative adversarial networks, and the like. The image reconstruction algorithm is merely an example, and the scope of the present disclosure is not limited thereto.

In the exemplary embodiments of the present disclosure, the domain may be a predetermined material or product, and a specific pattern on a predetermined material or product. The material may be, for example, fiber, leather, metal, glass, plastic, and wood. The product may be, for example, clothes, a lens, and furniture. The pattern may be, for example, a striped pattern, a flower pattern, and a dot pattern. The scope of the present disclosure is not limited to the foregoing examples.

In the exemplary embodiments of the present disclosure, the source domain means a pattern including defect data 213, and the target domain means a pattern for generating defect data by using the defect data 213 of the source domain. The source domain and the target domain may have different patterns. For example, in FIGS. 2A, 2B, and 2C, the source domain is a striped pattern and the target domain is a dot pattern, and defect data 405 (see FIG. 3) of the target domain may be generated from the defect data 213 of the source domain having a defect 214. The source domain and the target domain illustrated in FIGS. 2A, 2B, and 2C are merely the examples, and the scope of the present disclosure is not limited thereto.

In the exemplary embodiments of the present disclosure, the data may be image data. The image data may be defect image data including a defect or normal image data including no defect in the source domain or the target domain. The image may be a 3D image, a black and white image, an infrared image, an electronic image, and the like, and may be obtained through a film camera, a digital camera, a microscope, a magnifying glass, an infrared camera, an ultraviolet (UV) camera, an X-ray, a magnetic resonance imaging device, a predetermined image obtaining device, and the like. The image data may be compressed data, a RAW image, and an image data file. The format of the image data may include jpg, png, tif, psd, and Ai. The foregoing contents are merely the example, and the scope of the present disclosure is not limited thereto.

In the exemplary embodiments of the present disclosure, the defect data 213 means data including the defect 214, and the normal data 223 and 233 mean data including no defect. Herein, the defect may include an abnormal pattern generated due to tearing, abrasion, and crushing in the process, and the like, and the scope of the present disclosure is not limited thereto.

In the exemplary embodiments of the present disclosure, the mask may include a first mask 212 and a second mask 222, and the first mask 212 may mask the defect 214 of the defect data 213. The first mask 212 and the second mask 222 may be distinguished with different colors. The mask may have a predetermined shape. The mask is applied manually by humans, but may be automatically applied by a predetermined program, and the scope of the present disclosure is not limited thereto.

The training of the reconstruction algorithm 200 according to the exemplary embodiments of the present disclosure may include at least one of the trainings described below.

The training may be a process of training the reconstruction algorithm 200 so as to reconstruct data based on input data. Particularly, when the reconstruction algorithm 200 receives data, to which the mask is applied, and data, to which the mask is not applied, the training may be a process of training the reconstruction algorithm 200 so as to output data, to which the mask is reconstructed. The training of the reconstruction algorithm 200 may be the generation of a regression equation so as to minimize an error value between an output value and a target value based on input data. The training of the reconstruction algorithm 200 may be the adjustment of a value of at least one variable included in the reconstruction algorithm 200. According to the training of the reconstruction algorithm 200, a data reconstruction rate of the reconstruction algorithm 200 may be improved. The data reconstruction rate may be, for example, a sharpness increase rate and a matching rate with the input image data in the image data. The finally trained reconstruction algorithm may reconstruct data in the direction required by a user based on the input data. Particularly, when the finally trained reconstruction algorithm receives the normal data of the target domain, to which the first mask is applied, the reconstruction algorithm may output defect data of the target domain. The training of the reconstruction algorithm 200 may be performed by the computing device 100. The foregoing contents are merely the example, and the scope of the present disclosure is not limited thereto.

FIG. 2A is a diagram illustrating input and output during a first training of the reconstruction algorithm 200 according to the exemplary embodiment of the present disclosure.

In first training according to the exemplary embodiment of the present disclosure, the computing device 100 may input defect data 211 of the source domain, to which the first mask 212 is applied, and defect data 213 of the source domain, to which the first mask 212 is not applied, to the reconstruction algorithm 200. The computing device 100 may generate defect data 215 of the source domain, to which the first mask 212 is reconstructed (216), by using the reconstruction algorithm 200. Herein, the first mask may have different colors according to the type of defect. That is, in the exemplary embodiment of the present disclosure, the mask may include a mask masking the defect data and a mask masking the normal data, and the mask masking the defect data and the mask masking the normal data may have distinguished characteristics (for example, a color and a pattern). Further, the mask masking the defect data may have a distinguished characteristic (for example, a color and a pattern) according to the type of masked defect. For example, an imprint defect and a dye transfer defect in leather may be masked with different colored masks. The foregoing description is merely an example, and the present disclosure is not limited thereto.

FIG. 2B is a diagram illustrating input and output during a second training of the reconstruction algorithm 200 according to the exemplary embodiment of the present disclosure.

In the second training according to the exemplary embodiment of the present disclosure, the computing device 100 may input normal data 221 of the source domain, to which the second mask 222 is applied, and normal data 223 of the source domain, to which the second mask 222 is not applied, to the reconstruction algorithm 200. The computing device 100 may generate normal data 225 of the source domain, to which the second mask 222 is reconstructed (226), by using the reconstruction algorithm 200.

FIG. 2C is a diagram illustrating input and output during a third training of the reconstruction algorithm 200 according to the exemplary embodiment of the present disclosure.

In the third training according to the exemplary embodiment of the present disclosure, the computing device 100 may input normal data 231 of the target domain, to which the second mask 222 is applied, and normal data 233 of the target domain, to which the second mask 222 is not applied, to the reconstruction algorithm 200. The computing device 100 may generate normal data 235 of the target domain, to which the second mask 222 is reconstructed (236), by using the reconstruction algorithm 200.

The first, second, and third training of the present disclosure may be performed by using patches obtained by dividing an entire image in a predetermined size, as input, and may be performed by using a patch extracted from a portion corresponding to a defect in the image as input.

Figure 3:
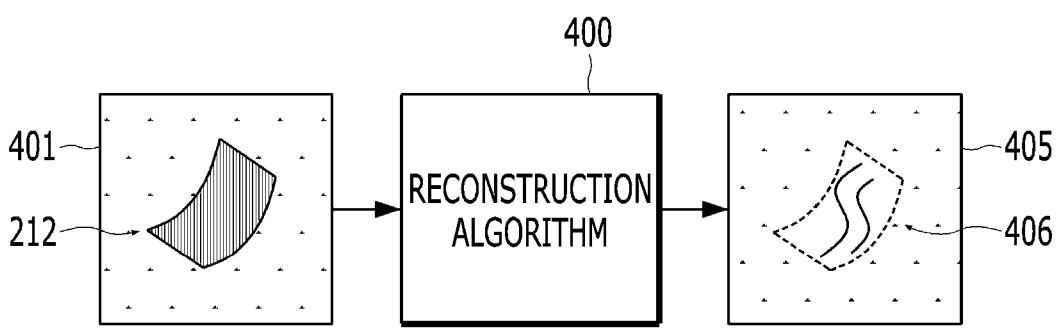
FIG. 3 is a diagram illustrating input and output when defect data of the target domain is generated by using the trained reconstruction algorithm according to the exemplary embodiment of the present disclosure.

FIG. 3 is a diagram illustrating input and output when defect data of the target domain is generated by using the trained reconstruction algorithm according to the exemplary embodiment of the present disclosure.

When a reconstruction algorithm 400 finally trained so as to generate the data, to which the mask is reconstructed, from the data, to which the mask is applied, according to the exemplary embodiment of the present disclosure receives normal data 401 of the target domain, to which the first mask 212 is applied, the reconstruction algorithm 400 may generate defect data 405 of the target domain. Particularly, when the first mask of the target domain is reconstructed 406, the defect 214 of the defect data 213 (see FIG. 2A) of the source domain is generated on the target domain, so that the defect data 405 of the target domain may be generated. The foregoing contents are merely the example, and the scope of the present disclosure is not limited thereto.

Figure 4:
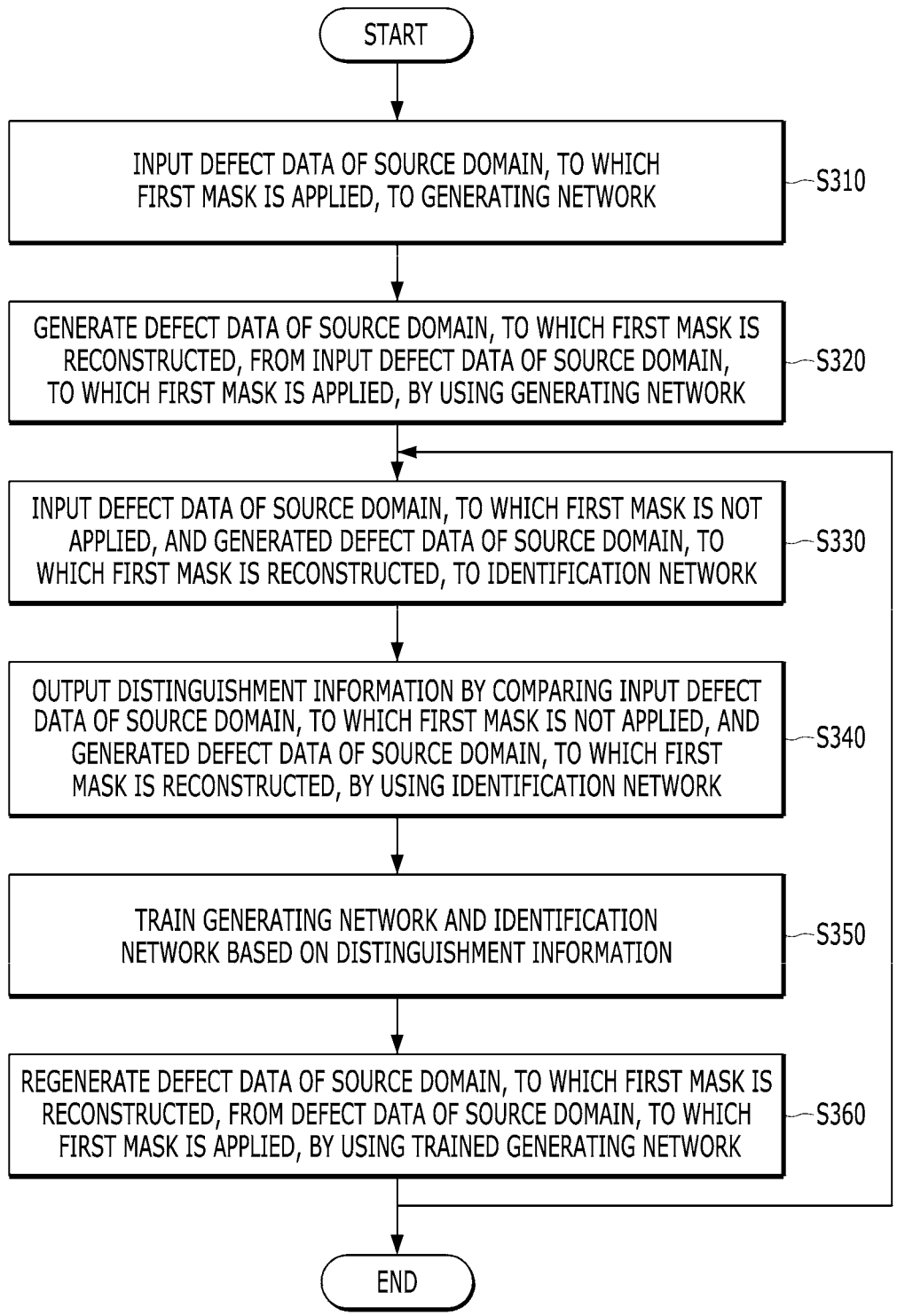
FIGS. 4 and 5 are diagrams illustrating a method of first training the reconstruction algorithm according to the exemplary embodiment of the present disclosure.
Figure 5:
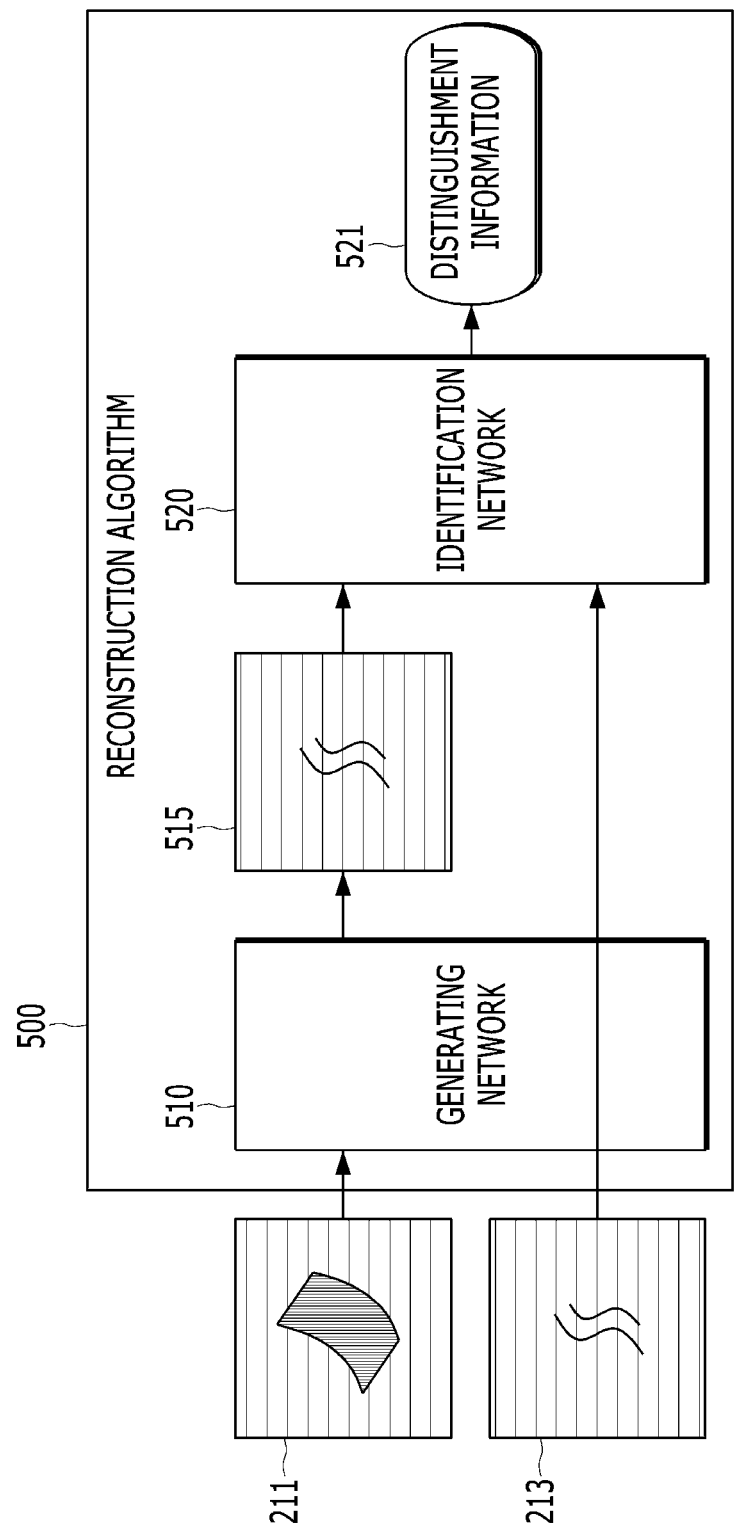

FIGS. 4 and 5 are diagrams illustrating a method of first training the reconstruction algorithm according to the exemplary embodiment of the present disclosure.

FIG. 4 is a flowchart illustrating a method of first training the reconstruction algorithm according to the exemplary embodiment of the present disclosure.

FIG. 5 is a diagram illustrating an example of the reconstruction algorithm performing the first training according to the exemplary embodiment of the present disclosure.

A reconstruction algorithm 500 according to the exemplary embodiment of the present disclosure may include a generating network 510 and an identification network 520. A network may consist of a set of interconnected computational units, which may generally be referred to as "nodes". The "nodes" may also be referred to as "neurons". The network consists of at least two nodes. The nodes (or neurons) configuring the networks may be interconnected by one or more "links".

Within the network, two or more nodes connected through the links may relatively form a relation of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, the node connecting the input node and the output node may have a weighted value. The weighted value is variable, and in order for the network to perform a desired function, the weighted value may be varied by a user or an algorithm. For example, when one or more input nodes are connected to one output node by links, respectively, a value of the output node may be determined based on values input to the input nodes connected to the output node and weighted values set in the link corresponding to each of the input nodes.

As described above, in the network, two or more nodes are connected with each other through one or more links to form a relation of an input node and an output node within the network. A characteristic of the network may be determined according to the number of nodes and links within the network, a correlation between the nodes and the links, and a weighted value assigned to each of the links. For example, when there are two networks in which the numbers of nodes and links are the same and the weighted values between the links are different, two networks may be recognized to be different from each other.

The network may consist of two or more nodes. Some of the nodes configuring the network may configure one layer based on distances from an initial input node. For example, a set of nodes having a distance n from an initial input node may form an $n^{th}$ layer. The distance from the initial input node may be defined by the minimum number of links, which needs to be passed from the initial input node to a corresponding node. However, the definition of the layer is arbitrary for the description, and a degree of the layer within the network may be defined by a different method from the foregoing method. For example, the layers of the nodes may be defined by a distance from a final output node.

The initial input node may mean one or more nodes to which data is directly input without passing through a link in a relation with other nodes among the nodes within the network. Otherwise, the initial input node may mean nodes which do not have other input nodes connected through the links in a relation with the node based on the link within the network. Similarly, the final output node may be one or more nodes which do not have an output node in a relation with other nodes among the nodes within the network. Further, the hidden node may mean nodes configuring the network, not the initial input node and the final output node. The network according to the exemplary embodiment of the present disclosure may be the network in the form that the number of nodes is decreased from the input layer to the hidden layer.

Figure 6:
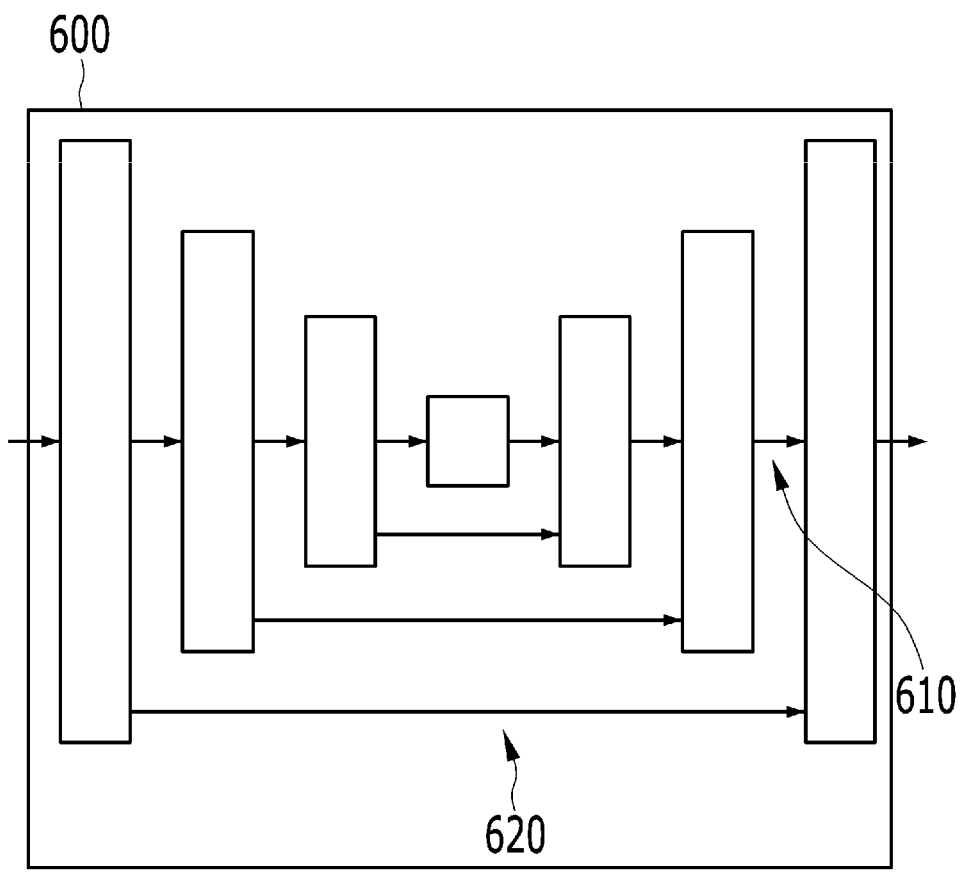
FIG. 6 is a schematic diagram illustrating a generating network in the reconstruction algorithm according to the exemplary embodiment of the present disclosure.

The computing device 100 according to the exemplary embodiment of the present disclosure may input defect data 211 of the source domain, to which the first mask is applied, to the generating network 510 (S310). In the case where the defect data is image data, the computing device 100 according to the exemplary embodiment of the present disclosure may progress a training process by inputting a patch extracted from the entire image to the generating network 510 and may also progress a training process by inputting a patch extracted from a defect part of the image to the generating network 510. The mask may have different colors according to the kind of defect. That is, in the exemplary embodiment of the present disclosure, the mask may include a mask masking the defect data and a mask masking the normal data, and the mask masking the defect data and the mask masking the normal data may have distinguished characteristics (for example, a color and a pattern). Further, the mask masking the defect data may have a distinguished characteristic (for example, a color and a pattern) according to the type of masked defect. For example, an imprint defect and a dye transfer defect in leather may be masked with different colored masks. The foregoing description is merely an example, and the present disclosure is not limited thereto. The generating network 510 may consist of a Convolutional Neural Network (CNN), an auto encoder, and the like, and the present disclosure is not limited thereto. An example of the generating network 510 is illustrated in FIG. 6, and the present disclosure is not limited to the example illustrated in FIG. 6.

The computing device 100 according to the exemplary embodiment of the present disclosure may generate defect data 515 of the source domain, to which the first mask is reconstructed, from the input defect data 211 of the source domain, to which the first mask is applied, by using the generating network 510 (S320). The generating method is different according to the kind of reconstruction algorithm, and for example, the defect data may be generated by forming a predetermined random number distribution or a conditional random number distribution, and the scope of the present disclosure is not limited thereto.

The computing device 100 according to the exemplary embodiment of the present disclosure may input defect data 213 of the source domain, to which the first mask is not applied, and the generated defect data 515 of the source domain, to which the first mask is reconstructed, to the identification network 520 (S330).

The computing device 100 according to the exemplary embodiment of the present disclosure may output distinguishment information 521 by comparing the input defect data 213 of the source domain, to which the first mask is not applied, and the generated defect data 515 of the source data, to which the first mask is reconstructed, by using the identification network 520 (S340). Herein, the distinguishment information 521 may be a probability value that the identification network recognizes the defect data 515 of the source domain, to which the first mask is reconstructed, as the defect data 213 of the source domain, to which the first mask is not applied, or predetermined information for distinguishing the defect data 515 and the defect data 213 by comparing the plurality of data, and the scope of the present disclosure is not limited thereto.

Figure 7:
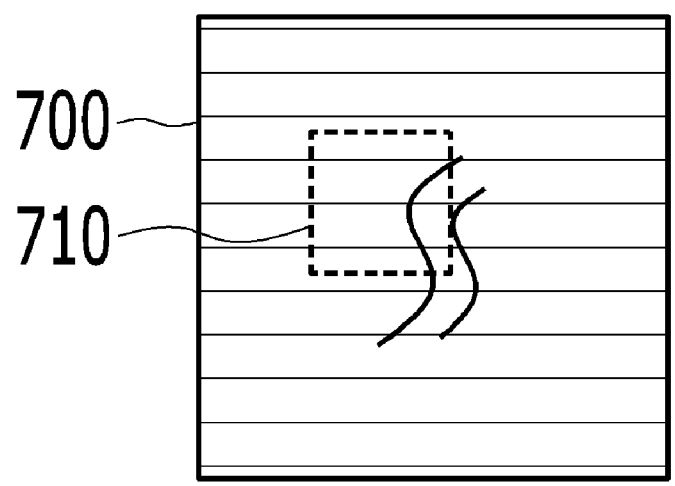
FIG. 7 is a diagram of an example of an image patch according to the exemplary embodiment of the present disclosure.

In the operation of outputting the distinguishment information by comparing the defect data 213 of the source domain, to which the first mask is not applied, and the generated defect data 515 of the source domain, to which the first mask is reconstructed, the data, to which the mask is reconstructed, and the data, to which the mask is not applied, may be divided into image patches having a predetermined size, and be compared for each image patch. The operation has an effect of enhancing high frequency information during the generation of the image. Herein, the image patch may have a size of N pixels×N pixels, and may have a size of 1 pixel. The identification network 520 aggregates response values for each image patch obtained by comparing the defect data 213 of the source domain, to which the first mask is not applied, and the generated defect data 515 of the source domain, to which the first mask is reconstructed, for each image patch to output final distinguishment information 521. An example of the image patch is illustrated in FIG. 7, and the present disclosure is not limited to the example illustrated in FIG. 7.

The comparison of the defect data 213 of the source domain, to which the first mask is not applied, and the generated defect data 515 of the source domain, to which the first mask is reconstructed, may include, for example, an operation of comparing the defect data 515 of the source domain, to which the first mask is reconstructed, and the defect data 211 of the source domain, to which the first mask is applied, and an operation of comparing the defect data 213 of the source domain, to which the first mask is not applied, and the defect data 211 of the source domain, to which the first mask is applied. The comparison process is merely an example, and the scope of the present disclosure is not limited thereto.

The computing device 100 according to the exemplary embodiment of the present disclosure may train the generating network 510 and the identification network 520 based on the distinguishment information 521 (S350). The operation of training the generating network 510 and the identification network 520 based on the distinguishment information 521 may include an operation of calculating a value of a loss function of the reconstruction algorithm 500 from the distinguishment information 521. Herein, the loss function means a function expressing a value to be directly decreased or increased through the training. For example, the loss function may be expressed as below.

$$E_{x,y|Pdata(x,y)}[\log D(x,y)]+E_{x|Pdata(x),z|p_z(z)}[\log(1-D(x,G(x,z))]+\lambda \exists E_{x,y|Pdata(x,y),z|p_z(z)}[\|y-G(x,z)\|_1]$$

In the equation, λ means a weighted value for reflecting a difference value between the defect data 515 of the source domain, to which the first mask is reconstructed, and the defect data 213 of the source domain, to which the first mask is not applied, to the loss function. The equation is merely an example, and the scope of the present disclosure is not limited thereto.

For the training of the network, the generating network 510 may be trained so that a value for the loss function is decreased, and simultaneously, the identification network 520 may be trained so that a value for the loss function is increased. The training may be performed through backward propagation, and the presented training method is merely an example, and the scope of the present disclosure is not limited thereto.

The computing device 100 according to the exemplary embodiment of the present disclosure may regenerate defect data of the source domain, to which the first mask is reconstructed, from the defect data of the source domain, to which the first mask is applied, by using the trained generating network (S360). The computing device 100 outputs distinguishment information by comparing the regenerated defect data of the source domain, to which the first mask is reconstructed, with the defect data 213 of the source domain, to which the first mask is not applied, by using the identification network 520 to repeat the foregoing process. The repetition may be performed until the generating network 510 is trained so that the value for the loss function is minimized and simultaneously, the identification network 520 is trained so that the value for the loss function is maximized, but the training termination condition is merely an example, and the scope of the present disclosure is not limited thereto. The foregoing process may be identically applied to the second training and the third training.

FIG. 6 is a schematic diagram illustrating the generating network in the reconstruction algorithm according to the exemplary embodiment of the present disclosure.

The generating network 600 according to the exemplary embodiment of the present disclosure consists of a total of n layers, the first layer to the $n^{th}$ layer are sequentially connected, and separately, the $i^{th}$ layer and the $(n-i+1)^{th}$ layer are connected (i>0, i<n/2). For example, the generating network 600 of FIG. 6 consists of a total of 7 layers, the first layer to the seventh layer are sequentially connected (610), and separately, the first layer and the seventh layer are connected, the second layer and the sixth layer are connected, and the third layer and the sixth layer are connected (620). The structure additionally establishes a short path separately from a general sequential information transmission path, thereby achieving an effect of preventing dilution of information on the input data and ensuring high resolution of the generated image. The generating network 600 illustrated in FIG. 6 is merely an example, and the disclosure is not limited thereto.

FIG. 7 is a diagram of an example of an image patch according to the exemplary embodiment of the present disclosure.

According to the exemplary embodiment of the present disclosure, in the operation of outputting the distinguishment information by comparing the data, to which the mask is not applied, and data 700, to which the mask is reconstructed, in the identification network, the data may be compared based on each image patch 710 by dividing the data 700, to which the mask is reconstructed, and the data, to which the mask is not applied, into image patches 710 having a predetermined size. The image patch 710 may have a size of N pixels×N pixels, and may have a size of 1 pixel. The image patch of the present disclosure may be extracted from the entirety or a part of the data. For example, the image patch of the present disclosure may be extracted mainly based on the defect part in the defect data. The identification network may output final distinguishment information by aggregating the response values for each image patch obtained by comparing the defect data 213 of the source domain, to which the first mask is not applied, and the generated defect data 515 of the source domain, to which the first mask is reconstructed for each image patch, and the scope of the present disclosure is not limited thereto.

Figure 8:
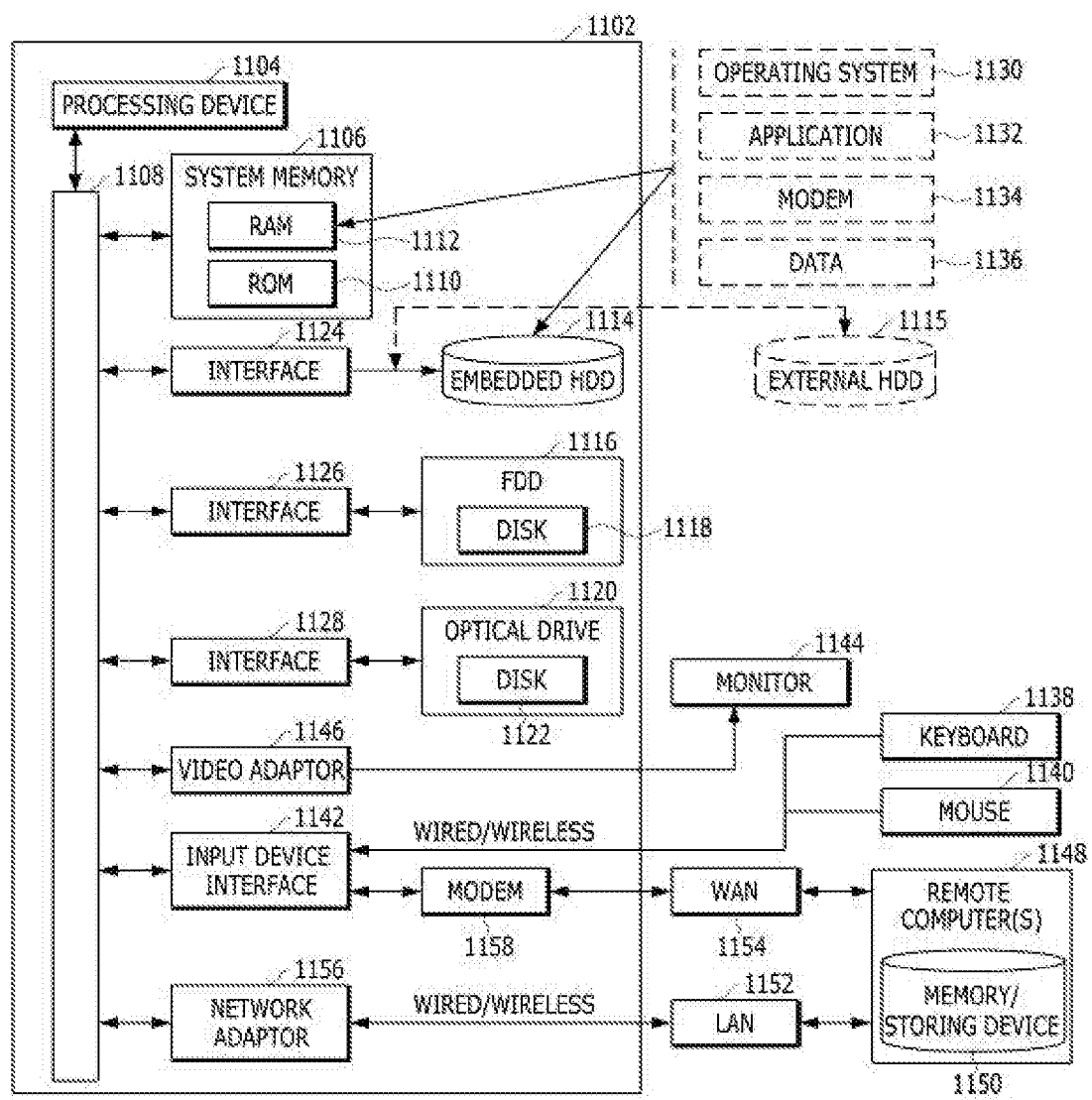
FIG. 8 is a simple and general schematic diagram illustrating an example of a computing environment, in which the exemplary embodiments of the present disclosure may be implemented.

FIG. 8 is a simple and general schematic diagram illustrating an example of a computing environment, in which the exemplary embodiments of the present disclosure may be implemented.

The present disclosure has been generally described in relation to a computer executable command executable in one or more computers, but those skilled in the art will appreciate that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, portable and non-portable media. As a non-limited example, the computer readable medium may include a computer readable storage medium and a computer readable transport medium. The computer readable storage medium includes volatile and non-volatile media, transitory and non-transitory media, portable and non-portable media constructed by a predetermined method or technology, which stores information, such as a computer readable command, a data structure, a program module, or other data. The computer readable storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various common processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 2110, and a RAM 2112. A basic input/output system (BIOS) is stored in a non-volatile memory 2110, such as a ROM, an erasable and programmable ROM (EPROM), and an EEPROM, and the BIOS includes a basic routine helping a transport of information among the constituent elements within the computer 1102 at a time, such as starting. The RAM 2112 may also include a high-rate RAM, such as a static RAM, for caching data.

The computer 1102 also includes an embedded hard disk drive (HDD) 2114 (for example, enhanced integrated drive electronics (EIDE) and serial advanced technology attachment (SATA))—the embedded HDD 2114 being configured for outer mounted usage within a proper chassis (not illustrated)—a magnetic floppy disk drive (FDD) 2116 (for example, which is for reading data from a portable diskette 2118 or recording data in the portable diskette 2118), and an optical disk drive 1120 (for example, which is for reading a CD-ROM disk 1122, or reading data from other high-capacity optical media, such as a DVD, or recording data in the high-capacity optical media). A hard disk drive 2114, a magnetic disk drive 2116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 2130, one or more application programs 2132, other program modules 2134, and program data 2136 may be stored in the drive and the RAM 2112. An entirety or a part of the operation system, the application, the module, and/or data may also be cached in the RAM 2112. Those skilled in the art will appreciate well that the present disclosure may be implemented by several commercially available operating systems or a combination of the operating systems.

A user may input a command and information to the computer 1102 through one or more wired/wireless input devices, for example, a keyboard 2138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display device are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

The related contents have been described in the best mode for carrying out the disclosure as described above.

The present disclosure may be used in the generation of training data of an artificial neural network utilized in a field of processing an image by using a computing device.

What is claimed is:

1. A method for generating defect data of a target domain using defect data of a source domain, executed on one or more processors of a computing device, the method comprising:

inputting a defect data of the source domain, to which a first mask is applied and a defect data of the source domain, to which the first mask is not applied, to a reconstruction algorithm;

first training the reconstruction algorithm to generate a defect data of the source domain, to which the first mask is reconstructed;

inputting a normal data of the source domain, to which a second mask is applied and a normal data of the source domain, to which the second mask is not applied, to the reconstruction algorithm;

second training the reconstruction algorithm to generate a normal data of the source domain, to which the second mask is reconstructed;

inputting a normal data of the target domain, to which the second mask is applied and a normal data of the target domain, to which the second mask is not applied, to the reconstruction algorithm; and third training the reconstruction algorithm to generate a normal data of the target domain, to which the second mask is reconstructed;

inputting a normal data of the target domain, to which the first mask is applied, to the reconstruction algorithm which is trained to generate a mask reconstructed data from a mask applied data; and generating a defect data of the target domain using a final-trained reconstruction algorithm.

2. The method for generating defect data of a target domain using defect data of a source domain according to claim 1, wherein the defect data and the normal data is image data.

3. The method for generating defect data of a target domain using defect data of a source domain according to claim 1, wherein the first mask masks a defect part of a defect data, and the first mask and the second mask are distinguished by different colors.

4. The method for generating defect data of a target domain using defect data of a source domain according to claim 1, wherein the first mask is a shape for masking a defect part of a defect data, and the second mask is a same or different shape as the first mask.

5. The method for generating defect data of a target domain using defect data of a source domain according to claim 1, wherein the source domain and the target domain have different patterns or shapes.

6. A method for generating defect data of a target domain using defect data of a source domain, executed on one or more processors of a computing device, the method comprising:

inputting a defect data of the source domain, to which a first mask is applied and a defect data of the source domain, to which the first mask is not applied, to a reconstruction algorithm;

first training the reconstruction algorithm to generate a defect data of the source domain, to which the first mask is reconstructed;

inputting a normal data of the source domain, to which a second mask is applied and a normal data of the source domain, to which the second mask is not applied, to the reconstruction algorithm;

second training the reconstruction algorithm to generate a normal data of the source domain, to which the second mask is reconstructed;

inputting a normal data of the target domain, to which the second mask is applied and a normal data of the target domain, to which the second mask is not applied, to the reconstruction algorithm; and third training the reconstruction algorithm to generate a normal data of the target domain, to which the second mask is reconstructed, wherein the reconstruction algorithm comprises:

a generating network; and
an identification network, and
wherein the first training comprises:

inputting the defect data of the source domain, to which the first mask is applied, to the generating network;

generating the defect data of the source domain, to which the first mask is reconstructed, from the defect data of the source domain, to which the first mask is applied, using the generating network;

inputting the defect data of the source domain, to which the first mask is not applied and the defect data of the source domain, to which the first mask is reconstructed, to the identification network;

outputting distinguishing information by comparing the defect data of the source domain, to which the first mask is not applied, and the defect data of the source domain, to which the first mask is reconstructed, using the identification network;

training the generating network and the identification network based on the distinguishing information; and regenerating the defect data of the source domain, to which the first mask is reconstructed, from the defect data of the source domain, to which the first mask is applied, using the trained generating network.

7. The method for generating defect data of a target domain using defect data of a source domain according to claim 6, wherein the outputting of distinguishing information by comparing a data, to which the mask is not applied, and a data, to which the mask is reconstructed, using the identification network comprises:

dividing the data, to which the mask is reconstructed and the data to which the mask is not applied, into image patches of a constant size, and comparing each of an image patches between each image patch.

8. The method for generating defect data of a target domain using defect data of a source domain according to claim 7, wherein the image patch in the size of 1 pixel.

9. The method for generating defect data of a target domain using defect data of a source domain according to claim 6, wherein the training the generating network and the identification network based on the distinguishing information comprises:

calculating a value for a loss function of the reconstruction algorithm from the distinguishing information.

10. The method for generating defect data of a target domain using defect data of a source domain according to claim 6, wherein the generating network is composed of n layers, the first layer to the nth layer of the generating network are sequentially connected, an ith layer and a n-i+1th layer of the generating network are connected, and wherein $i>0$ and $i<n/2$.

11. A non-transitory computer readable medium storing a computer program, wherein when the computer program is executed by one or more processors of a computing device, the computer program performs an operation, and the operations comprise:

inputting a defect data of a source domain, to which a first mask is applied and a defect data of the source domain, to which the first mask is not applied, to a reconstruction algorithm;

first training the reconstruction algorithm to generate a defect data of the source domain, to which the first mask is reconstructed;

inputting a normal data of the source domain, to which a second mask is applied and a normal data of the source domain, to which the second mask is not applied, to the reconstruction algorithm;

second training the reconstruction algorithm to generate a normal data of the source domain, to which the second mask is reconstructed;
inputting a normal data of a target domain, to which the second mask is applied and a normal data of the target domain, to which the second mask is not applied, to the reconstruction algorithm;
third training the reconstruction algorithm to generate a normal data of the target domain, to which the second mask is reconstructed;
inputting a normal data of the target domain, to which the first mask is applied, to the reconstruction algorithm which is trained to generate a mask reconstructed data from a mask applied data; and
generating a defect data of the target domain using a final-trained reconstruction algorithm.

12. A computing device for generating defect data of a target domain using defect data of a source domain, including:
one or more processors; and
a memory storing program codes executable in the one or more processors, and
wherein the one or more processors are configured to:
input a defect data of the source domain, to which a first mask is applied and a defect data of the source domain, to which the first mask is not applied, to a reconstruction algorithm;
first train the reconstruction algorithm to generate a defect data of the source domain, to which the first mask is reconstructed;
input a normal data of the source domain, to which a second mask is applied and a normal data of the source domain, to which the second mask is not applied, to the reconstruction algorithm;
second train the reconstruction algorithm to generate a normal data of the source domain, to which the second mask is reconstructed;
input a normal data of the target domain, to which the second mask is applied and a normal data of the target domain, to which the second mask is not applied, to the reconstruction algorithm; and
third train the reconstruction algorithm to generate a normal data of the target domain, to which the second mask is reconstructed,
wherein the reconstruction algorithm comprises:
a generating network; and
an identification network, and
wherein the first training comprises:
inputting the defect data of the source domain, to which the first mask is applied, to the generating network;
generating the defect data of the source domain, to which the first mask is reconstructed, from the defect data of the source domain, to which the first mask is applied, using the generating network;
inputting the defect data of the source domain, to which the first mask is not applied and the defect data of the source domain, to which the first mask is reconstructed, to the identification network;
outputting distinguishing information by comparing the defect data of the source domain, to which the first mask is not applied, and the defect data of the source domain, to which the first mask is reconstructed, using the identification network;
training the generating network and the identification network based on the distinguishing information; and
regenerating the defect data of the source domain, to which the first mask is reconstructed, from the defect data of the source domain, to which the first mask is applied, using the trained generating network.

* * * * *